(12) United States Patent
Ogawa et al.

(10) Patent No.: US 10,611,877 B2
(45) Date of Patent: Apr. 7, 2020

(54) CURABLE ORGANOPOLYSILOXANE COMPOSITION, CURED PRODUCT THEREOF, AND METHOD FOR FORMING CURED FILM

(71) Applicant: Dow Corning Toray Co., Ltd., Tokyo (JP)

(72) Inventors: Takuya Ogawa, Chiba (JP); Satoshi Onodera, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 0 days.

(21) Appl. No.: 15/534,572

(22) PCT Filed: Dec. 4, 2015

(86) PCT No.: PCT/JP2015/006050
§ 371 (c)(1),
(2) Date: Jun. 9, 2017

(87) PCT Pub. No.: WO2016/098305
PCT Pub. Date: Jun. 23, 2016

(65) Prior Publication Data
US 2017/0342198 A1    Nov. 30, 2017

(30) Foreign Application Priority Data

Dec. 18, 2014 (JP) ................. 2014-256077

(51) Int. Cl.
| C08G 77/28 | (2006.01) |
| C08G 59/66 | (2006.01) |
| C08K 5/17 | (2006.01) |
| C09D 183/06 | (2006.01) |
| C09D 183/08 | (2006.01) |
| C08K 5/49 | (2006.01) |
| C08L 83/06 | (2006.01) |
| C08L 83/08 | (2006.01) |
| C09D 7/40 | (2018.01) |
| C08G 77/14 | (2006.01) |

(52) U.S. Cl.
CPC ............... C08G 59/66 (2013.01); C08K 5/17 (2013.01); C08K 5/49 (2013.01); C08L 83/06 (2013.01); C08L 83/08 (2013.01); C09D 7/40 (2018.01); C09D 183/06 (2013.01); C09D 183/08 (2013.01); C08G 77/14 (2013.01); C08G 77/28 (2013.01)

(58) Field of Classification Search
CPC .......... C08G 77/14; C08G 77/28; C08L 83/04
See application file for complete search history.

(56) References Cited

U.S. PATENT DOCUMENTS

| 3,455,877 A * | 7/1969 | Plueddemann ...... C07D 303/24 528/25 |
| 3,553,283 A * | 1/1971 | Doss ..................... C08G 59/66 215/12.2 |
| 5,358,983 A | 10/1994 | Morita |
| 6,245,836 B1 | 6/2001 | Nakamaru et al. |
| 2001/0039305 A1 | 11/2001 | Nakamaru et al. |
| 2006/0121386 A1* | 6/2006 | Kamikoriyama ...... G03G 9/107 430/111.35 |
| 2007/0225437 A1 | 9/2007 | Morita et al. |
| 2010/0213404 A1 | 8/2010 | Morita et al. |
| 2010/0273940 A1 | 10/2010 | Urakawa et al. |
| 2014/0087152 A1 | 3/2014 | Nakamura et al. |
| 2014/0151734 A1 | 6/2014 | Ito et al. |
| 2015/0024214 A1* | 1/2015 | Cameron ............. C09D 163/00 428/413 |

FOREIGN PATENT DOCUMENTS

| JP | 6420226 A | 1/1989 |
| JP | H04216856 A | 8/1992 |
| JP | H05320514 A | 12/1993 |
| JP | H0964391 A | 3/1997 |
| JP | H11302564 A | 11/1999 |

(Continued)

OTHER PUBLICATIONS

PCT/JP2015/006050 International Search Report dated Mar. 1, 2016, 2 pages.
English language abstract and machine translation for JP6420226 (A) extracted from https://www4.j-platpat.inpit.go.jp database on Jul. 20, 2017, 18 pages.
English language abstract and machine translation for JPH04216856 (A) extracted from http://worldwide.espacenet.com database on Jul. 19, 2017, 19 pages.
English language abstract and machine translation for JP2006022152 (A) extracted from http://worldwide.espacenet.com database on Jul. 6, 2017, 32 pages.

(Continued)

Primary Examiner — Margaret G Moore
(74) Attorney, Agent, or Firm — Warner Norcross + Judd LLP

(57) ABSTRACT

A curable organopolysiloxane composition comprises: (A) an epoxy group-containing organopolysiloxane represented by the average composition formula:

$$X_a R^1_b SiO_{(4-a-b)/2}$$

wherein X represents at least one type of epoxy group selected from a glycidoxyalky group, an epoxycycloalkyl alkyl group, and an epoxyalkyl group; $R^1$ represents a hydrogen atom, an alkyl group, an alkenyl group, an aryl group, an aralkyl group, a hydroxyl group, or an alkoxy group; provided at least two X groups are present in a molecule; and "a" and "b" are numbers satisfying: $0<a<1$, $0<b<3$, and $0.8<(a+b)<3$; (B) a compound having at least two mercapto groups in a molecule; and (C) an amine compound not having a N—H bond and/or a phosphine compound not having a P—H bond. The composition has favorable curability even at a relatively low temperature, and forms a cured film having excellent bonding with regard to an object to be coated.

20 Claims, No Drawings

(56) References Cited

FOREIGN PATENT DOCUMENTS

| | | |
|---|---|---|
| JP | 2005154766 A | 6/2005 |
| JP | 2006022152 A | 1/2006 |
| JP | 2006022153 A | 1/2006 |
| JP | 2009096865 A | 5/2009 |
| JP | 2013062157 A | 4/2013 |
| WO | WO2009075252 A1 | 6/2009 |
| WO | WO2012165012 A1 | 12/2012 |
| WO | 2013011628 A1 | 1/2013 |

OTHER PUBLICATIONS

English language abstract and machine translation for JP2006022153 (A) extracted from http://worldwide.espacenet.com database on Jul. 19, 2017, 23 pages.
English language abstract and machine translation for JPH11302564 (A) extracted from http://worldwide.espacenet.com database on Sep. 7, 2017, 17 pages.
Machine assisted English translation of JPH0964391A obtained from https://worldwide.espacenet.com on Feb. 7, 2020, 10 pages.
Machine assisted English translation of JP2013062157A obtained from https://worldwide.espacenet.com on Feb. 7, 2020, 7 pages.

\* cited by examiner

CURABLE ORGANOPOLYSILOXANE COMPOSITION, CURED PRODUCT THEREOF, AND METHOD FOR FORMING CURED FILM

CROSS-REFERENCE TO RELATED APPLICATIONS

This application is the National Stage of International Application No. PCT/JP2015/006050 filed on 4 Dec. 2015, which claims priority to and all advantages of Japanese Patent Application No. 2014-256077 filed on 18 Dec. 2014, the content of which is hereby incorporated by reference.

TECHNICAL FIELD

The present invention relates to a curable organopolysiloxane composition, a cured product thereof, and a method for forming a cured film using the composition.

BACKGROUND ART

Curable organopolysiloxane compositions are cured to form cured products with excellent adhesion, bonding, weather resistance, and electrical properties, and therefore, the compositions are used in adhesives, sealing agents, coating agents, and the like in electrical or electronic parts. For example, patent document 1 proposes a curable organopolysiloxane composition comprising an epoxy group-containing organopolysiloxane, and a curing agent or curing catalyst; and patent document 2 proposes a curable organopolysiloxane composition comprising an epoxy group-containing organopolysiloxane, a straight chain organopolysiloxane having at least two phenolic hydroxyl groups, and a curing accelerator. However, this type of curable organopolysiloxane composition must be heated to 150° C. to cure, and thus quickly curing at a relatively low temperature of 30° C. or lower is difficult.

In recent years, a curable organopolysiloxane composition comprising, as a main agent, an epoxy group-containing organopolysiloxane, has been examined for application in paint compositions. When considering use of paint compositions outdoors during the winter, quick curing at 30° C. or lower is required. Therefore, a curable organopolysiloxane composition having favorable curability even at a relatively low temperature is required.

PRIOR ART DOCUMENTS

Patent Documents

Patent Document 1: Japanese Unexamined Patent Application Publication No. H05-320514
Patent Document 2: Japanese Unexamined Patent Application Publication No. 2005-154766

OVERVIEW OF THE INVENTION

Problem to be Solved by the Invention

An object of the present invention is to provide: a curable organopolysiloxane composition having favorable curability even at a relatively low temperature of 30° C. or lower, and that forms a cured film with excellent bonding with regard to an object to be coated; and a cured product with excellent bonding with regard to an object to be coated. Furthermore, another object of the present invention is to provide a method for forming a cured film at a relatively low temperature.

SUMMARY OF THE INVENTION

A curable organopolysiloxane composition of the present invention comprises:

(A) an epoxy group-containing organopolysiloxane represented by the average composition formula:

$$X_a R^1_b SiO_{(4-a-b)/2}$$

wherein, X represents at least one type of epoxy group selected from a group consisting of a glycidoxyalkyl group, an epoxycycloalkyl alkyl group, and an epoxyalkyl group; $R^1$ represents a hydrogen atom, alkyl group with 1 to 12 carbon atoms, alkenyl group with 2 to 12 carbon atoms, aryl group with 6 to 20 carbon atoms, aralkyl group with 7 to 20 carbon atoms, hydroxyl group, or alkoxy group with 1 to 6 carbon atoms; however, at least two X are present in a molecule; and "a" and "b" are numbers satisfying: $0<a<1$, $0<b<3$, and $0.8<a+b<3$;

(B) a compound having at least two mercapto groups in a molecule, in an amount such that mercapto groups in component (B) per 1 mol of the epoxy group in component (A) are 0.3 to 3 mols; and (C) an amine compound not having a N—H bond and/or a phosphine compound not having a P—H bond, in an amount of 0.01 to 10 mass % per the total amount of components (A) through (C).

A cured product of the present invention is formed by curing the aforementioned curable organopolysiloxane composition.

A method of forming a cured film of the present invention includes steps of: coating the curable organopolysiloxane composition onto an object to be coated; and performing curing at −5 to 30° C.

Advantageous Effects of the Invention

The curable organopolysiloxane composition of the present invention has favorable curability at a relatively low temperature, and can form a cured film with excellent bonding with regard to an object to be coated. Furthermore, a method for forming a cured film of the present invention can quickly cure the curable organopolysiloxane composition at a relatively low temperature.

DESCRIPTION OF EMBODIMENTS

A curable organopolysiloxane composition of the present invention is described below in detail.

An epoxy group-containing organopolysiloxane of component (A) is a main component of the present composition, and is represented by the average composition formula:

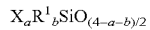
$$X_a R^1_b SiO_{(4-a-b)/2}$$

In the formula, X represents at least one type of epoxy group selected from the group consisting of a glycidoxyalkyl group, an epoxycycloalkyl alkyl group, and an epoxyalkyl group. Examples of the glycidoxyalkyl groups include 2-glycidoxyethyl groups, 3-glycidoxypropyl groups, and 4-glycidoxybutyl groups. Examples of the epoxycycloalkyl alkyl groups include 2-(3,4-epoxycyclohexyl)ethyl groups and 3-(3,4-epoxycyclohexyl)propyl groups. Examples of the epoxyalkyl groups include 2,3-epoxypropyl groups, 3,4-epoxybutyl groups, and 4,5-epoxypentyl groups. Component (A) has at least two epoxy groups (X) in a molecule.

Furthermore, in the formula, $R^1$ represents a hydrogen atom, alkyl group with 1 to 12 carbon atoms, alkenyl group with 2 to 12 carbon atoms, aryl group with 6 to 20 carbon atoms, aralkyl group with 7 to 20 carbon atoms, hydroxyl group, or alkoxy group with 1 to 6 carbon atoms. Examples of the alkyl group include a methyl group, ethyl group, propyl group, butyl group, pentyl group, hexyl group, heptyl group, octyl group, nonyl group, decyl group, undecyl group, and dodecyl group, but a methyl group is preferred from the perspective of economic efficiency and heat resistance. Examples of the alkenyl group include a vinyl group, allyl group, butenyl group, pentenyl group, hexenyl group, heptenyl group, octenyl group, nonenyl group, decenyl group, undecenyl group, and dodecenyl group, but a vinyl group, allyl group, hexenyl group, and octenyl group are preferred from the perspective of economic efficiency and reactivity. Examples of the aryl group include a phenyl group, tolyl group, xylyl group, naphthyl group, biphenyl group, and phenoxyphenyl group, but phenyl groups, tolyl groups, and naphthyl groups are preferred from the perspective of economic efficiency. In particular, by introducing an aryl group, and particularly a phenyl group into the organopolysiloxane of component (A), compatibility with component (B) tends to improve and weather resistance of an obtained cured product tends to improve. Examples of the aralkyl group include a benzyl group, phenethyl group, and methylphenylmethyl group. Further examples include groups where a portion of or all of the hydrogen atoms bonded to the alkyl group, alkenyl group, aryl group, or aralkyl group are substituted by a chlorine atom, bromine atom, or other halogen atom. Examples of the alkoxy group include a methoxy group, ethoxy group, n-propoxy group, i-propoxy group, n-butoxy group, sec-butoxy group, and tert-butoxy group. $R^1$ may have two or more types of the aforementioned groups.

Furthermore, in the formula, "a" is a number that indicates a ratio of epoxy groups to silicon atoms, and satisfies $0<a<1$, and preferably $0<a\leq0.6$, or $0<a\leq0.4$. Furthermore, in the formula, "b" is a number that indicates a ratio of hydrogen atoms, alkyl groups with 1 to 12 carbon atoms, alkenyl groups with 2 to 12 carbon atoms, aryl groups with 6 to 20 carbon atoms, aralkyl groups with 7 to 20 carbon atoms, hydroxyl groups, or alkoxy groups with 1 to 6 carbon atoms with regard to silicon atoms, and satisfies $0<b<3$. However, the total of "a" and "b" is a number that satisfies: $0.8<a+b<3$, and preferably $1<a+b\leq2.2$, or $1<a+b\leq2.0$. This is because when "a" is a number within the aforementioned range, the curability of the obtained curable organopolysiloxane composition at a relatively low temperature is favorable, and the mechanical strength of the obtained cured product is favorable. This is also because when "b" is a number within the aforementioned range, the mechanical strength of a cured product improves. Furthermore, when the total of "a" and "b" is a number within the aforementioned range, the curability of the obtained curable organopolysiloxane composition at a relatively low temperature is favorable, and the mechanical strength of the obtained cured product is favorable.

The molecular weight of component (A) is not particularly restricted, but the weight average molecular weight measured by gel permeation chromatography is preferably 1,000 or more and 50,000 or less. This is because when the weight average molecular weight of component (A) is equal to or greater than the lower limit of the aforementioned range, the mechanical properties of the obtained cured product are favorable, and when equal to or less than the upper limit of the aforementioned range, the curing rate of the obtained curable organopolysiloxane composition improves.

Examples of component (A) include one type or a mixture of two or more types of an organopolysiloxane as represented by the following average unit formulas. Note that in the formulas, Me, Ph, Vi, Ep, and Ep' respectively represent a methyl group, phenyl group, vinyl group, 3-glycidoxypropyl group, and 2-(3,4-epoxycyclohexyl) ethyl group; x1, x2, x3, and x4 are respectively positive numbers; and the total of x1, x2, x3, and x4 in one molecule is 1.

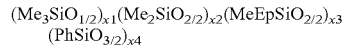

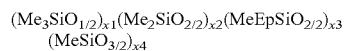

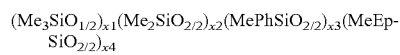

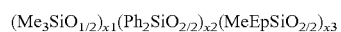

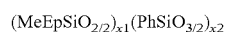

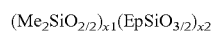

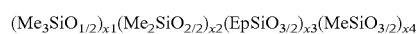

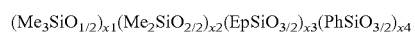

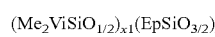

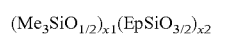

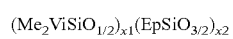

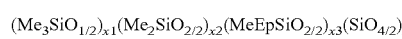

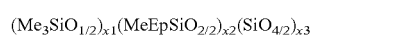

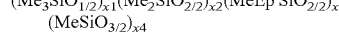

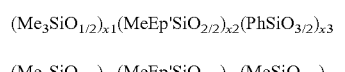

$(Me_3SiO_{1/2})_{x1}(Me_2SiO_{2/2})_{x2}(MeEp'SiO_{2/2})_{x3}$ $(Me_3SiO_{1/2})_{x1}(Me_2SiO_{2/2})_{x2}(MePhSiO_{2/2})_{x3}(MeEp'SiO_{2/2})_{x4}$ $(Me_3SiO_{1/2})_{x1}(MePhSiO_{2/2})_{x2}(MeEp'SiO_{2/2})_{x3}$ $(Me_3SiO_{1/2})_{x1}(Ph_2SiO_{2/2})_{x2}(MeEp'SiO_{2/2})_{x3}$ $(Me_2SiO_{2/2})_{x1}(MeEp'SiO_{2/2})_{x2}(PhSiO_{3/2})_{x3}$ $(MeEp'SiO_{2/2})_{x1}(PhSiO_{3/2})_{x2}$ $(Me_2SiO_{2/2})_{x1}(Ep'SiO_{3/2})_{x2}$ $(Me_3SiO_{1/2})_{x1}(Me_2SiO_{2/2})_{x2}(Ep'SiO_{3/2})_{x3}(MeSiO_{3/2})_{x4}$ $(Me_3SiO_{1/2})_{x1}(Me_2SiO_{2/2})_{x2}(Ep'SiO_{3/2})_{x3}(PhSiO_{3/2})_{x4}$ $(Me_3SiO_{1/2})_{x1}(Ep'SiO_{3/2})_{x2}(MeSiO_{3/2})_{x3}$ $(Me_3SiO_{1/2})_{x1}(Ep'SiO_{3/2})_{x2}(PhSiO_{3/2})_{x3}$ $(Me_2ViSiO_{1/2})_{x1}(Ep'SiO_{3/2})_{x2}(PhSiO_{3/2})_{x3}$ $(Me_3SiO_{1/2})_{x1}(Ep'SiO_{3/2})_{x2}$ $(Me_2ViSiO_{1/2})_{x1}(Ep'SiO_{3/2})_{x2}$ $(Me_3SiO_{1/2})_{x1}(Me_2SiO_{2/2})_{x2}(MeEp'SiO_{2/2})_{x3}(SiO_{4/2})_{x4}$ $(Me_3SiO_{1/2})_{x1}(MeEp'SiO_{2/2})_{x2}(SiO_{4/2})_{x3}$ $(Me_3SiO_{1/2})_{x1}(Me_2SiO_{2/2})_{x2}(Ep'SiO_{3/2})_{x3}(SiO_{4/2})_{x4}$

The compound of component (B) is a component for curing the present composition by reacting with the epoxy group in component (A). Component (B) is not particularly restricted so long as at least two mercapto groups are provided in a molecule, but is preferably (B1) a mercapto group-containing organopolysiloxane as represented by the average composition formula:

$$Y_c R^2_d SiO_{(4-c-d)/2}$$

and/or (B2) a thiol compound having at least two mercapto groups in a molecule.

In the formula for component (B1), Y represents at least one type of mercapto group selected from a group consisting of a mercaptoalkyl group and a mercaptoaryl group. Examples of the mercaptoalkyl group include a 3-mercaptopropyl groups, a 4-mercaptobutyl group, and a 6-mercaptohexyl group. Examples of the mercaptoaryl group include a 4-mercaptophenyl group, a 4-mercaptomethyl phenyl group, and a 4-(2-mercaptoethyl) phenyl group. Component (B1) has at least two mercapto groups (Y) in a molecule.

Furthermore, in the formula, $R^2$ represents a hydrogen atom, alkyl group with 1 to 12 carbon atoms, alkenyl group with 2 to 12 carbon atoms, aryl group with 6 to 20 carbon atoms, aralkyl group with 7 to 20 carbon atoms, hydroxyl group, or alkoxy group with 1 to 6 carbon atoms. Examples of the alkyl group include the same groups as the aforementioned $R^1$, and a methyl group is preferred from the perspectives of economic efficiency and heat resistance. Examples of the alkenyl group include the same groups as the aforementioned $R^1$, and a vinyl group, allyl group, hexenyl group, and octenyl group are preferred from the perspective of of economic efficiency and reactivity. Examples of the aryl group include the same groups as the aforementioned $R^1$, and a phenyl group, tolyl group, and naphthyl group are preferred from the perspective of economic efficiency. Examples of the aralkyl group include the same groups as the aforementioned $R^1$. Further examples include groups where a portion or all of the hydrogen atoms bonded to the alkyl group, alkenyl group, aryl group, or aralkyl group are substituted by a chlorine atom, bromine atom, or other halogen atom. Examples of the alkoxy group include the same groups as the aforementioned $R^1$. $R^2$ may have two or more types of the aforementioned groups.

Furthermore, in the formula, "c" is a number that indicates a ratio of mercapto groups to silicon atoms, and satisfies: $0<c<1$, and preferably $0<c\leq0.6$, or $0<c\leq0.4$. Furthermore, in the formula, "d" is a number that indicates a ratio of hydrogen atoms, alkyl groups with 1 to 12 carbon atoms, alkenyl groups with 2 to 12 carbon atoms, aryl groups with 6 to 20 carbon atoms, aralkyl groups with 7 to 20 carbon atoms, hydroxyl groups, or alkoxy groups with 1 to 6 carbon atoms with regard to silicon atoms, and satisfies: $0<d<3$. However, the total of "c" and "d" is a number that satisfies $0.8<c+d<3$, and preferably $1<c+d\leq2.5$, or $1<c+d\leq2.3$. This is because when "c" is a number within the aforementioned range, the curability of the obtained curable organopolysiloxane composition at a relatively low temperature is favorable, and the mechanical strength of the obtained cured product is favorable. Furthermore, use when "d" is a number within the aforementioned range, the mechanical strength of a cured product improves. In addition, when the total of "c" and "d" is a number within the aforementioned range, the curability of the obtained curable organopolysiloxane composition at a relatively low temperature is favorable, and the mechanical strength of the obtained cured product is favorable.

The molecular weight of component (B1) is not particularly restricted, but the weight average molecular weight measured by gel permeation chromatography is preferably 500 or more and 50,000 or less. This is because when the weight average molecular weight of component (B1) is equal to or greater than the lower limit of the aforementioned range, the mechanical properties of the obtained cured product are favorable, and when equal to or lower than the upper limit of the aforementioned range, the curing rate of the obtained curable organopolysiloxane composition improves.

Examples of component (B1) include one type or a mixture of two or more types of an organopolysiloxane as represented by the following average unit formulas. Note that in the formulas, Me, Ph, Vi, and Thi respectively represent a methyl group, phenyl group, vinyl group, and 3-mercaptopropyl group; y1, y2, y3, and y4 are respectively positive numbers; and the total of y1, y2, y3, and y4 in a molecule is 1.

$(Me_3SiO_{1/2})_{y1}(Me_2SiO_{2/2})_{y2}(MeThiSiO_{2/2})_{y3}(PhSiO_{3/2})_{y4}$ $(Me_2ViSiO_{1/2})_{y1}(Me_2SiO_{2/2})_{y2}(MeThiSiO_{2/2})_{y3}(PhSiO_{3/2})_{y4}$ $(Me_3SiO_{1/2})_{y1}(Me_2SiO_{2/2})_{y2}(MeThiSiO_{2/2})_{y3}(MeSiO_{3/2})_{y4}$ $(Me_3SiO_{1/2})_{y1}(MeThiSiO_{2/2})_{y2}(PhSiO_{3/2})_{y3}$ $(Me_3SiO_{1/2})_{y1}(MeThiSiO_{2/2})_{y2}(MeSiO_{3/2})_{y3}(PhSiO_{3/2})_{y4}$ $(Me_3SiO_{1/2})_{y1}(Me_2SiO_{2/2})_{y2}(MeThiSiO_{2/2})_{y3}$ $(Me_3SiO_{1/2})_{y1}(Me_2SiO_{2/2})_{y2}(MePhSiO_{2/2})_{y3}(MeThiSiO_{2/2})_{y4}$ $(Me_3SiO_{1/2})_{y1}(MePhSiO_{2/2})_{y2}(MeThiSiO_{2/2})_{y3}$ $(Me_3SiO_{1/2})_{y1}(Ph_2SiO_{2/2})_{y2}(MeThiSiO_{2/2})_{y3}$ $(Me_2SiO_{2/2})_{y1}(MeThiSiO_{2/2})_{y2}(PhSiO_{3/2})_{y3}$ $(Me_2SiO_{2/2})_{y1}(ThiSiO_{3/2})_{y2}$ $(Me_3SiO_{1/2})_{y1}(Me_2SiO_{2/2})_{y2}(ThiSiO_{3/2})_{y3}(MeSiO_{3/2})_{y4}$ $(Me_3SiO_{1/2})_{y1}(Me_2SiO_{2/2})_{y2}(ThiSiO_{3/2})_{y3}(PhSiO_{3/2})_{y4}$ $(Me_3SiO_{1/2})_{y1}(ThiSiO_{3/2})_{y2}(MeSiO_{3/2})_{y3}$ $(Me_3SiO_{1/2})_{y1}(ThiSiO_{3/2})_{y2}(PhSiO_{3/2})_{y3}$ $(Me_2ViSiO_{1/2})_{y1}(ThiSiO_{3/2})_{y2}(PhSiO_{3/2})_{y3}$ $(Me_3SiO_{1/2})_{y1}(ThiSiO_{3/2})_{y2}$ $(Me_2ViSiO_{1/2})_{y1}(ThiSiO_{3/2})_{y2}$ $(Me_3SiO_{1/2})_{y1}(Me_2SiO_{2/2})_{y2}(MeThiSiO_{2/2})_{y3}(SiO_{4/2})_{y4}$ $(Me_3SiO_{1/2})_{y1}(MeThiSiO_{2/2})_{y2}(SiO_{4/2})_{y3}$ $(Me_3SiO_{1/2})_{y1}(Me_2SiO_{2/2})_{y2}(ThiSiO_{3/2})_{y3}(SiO_{4/2})_{y4}$

On the other hand, the thiol compound of (B2) is not particularly restricted so long as at least two mercapto groups are provided in a molecule, and examples include: trimethylolpropane-tris(3-mercaptopropionate), trimethylolpropane-tris(3-mercaptobutyrate), trimethylolethane-tris(3-mercaptobutyrate), pentaerythritol-tetrakis(3-mercaptopropionate), tetraethylene glylcol-bis(3-mercaptopropionate), dipentaerythritol-hexakis(3-mercaptopropionate), pentaerythritol-tetrakis(3-mercaptobutyrate), 1,4-bis(3-mercaptobutyryloxy) butane, and other ester compounds between mercaptocarboxylic acids and polyhydric alcohols; ethane dithiol, propane dithiol, hexamethylene dithiol, decamethylene dithiol, 3,6-dioxa-1,8-octane dithiol, 1,4-benzene dithiol, toluene-3,4-dithiol, xylylene dithiol, and other aliphatic or aromatic thiol compounds; 1,3,5-tris[(3-mercaptopropionyloxy)-ethyl]-isocyanurate, and 1,3,5-tris[(3-mercaptobutyryloxy)-ethyl]-isocyanurate; and mixtures of two or more types thereof.

The molecular weight of the thiol compound is not particularly restricted, but is preferably within a range of 200 to 2,000, within a range of 300 to 1,500, or within a range of 400 to 1,500. This is because when the molecular weight is equal to or greater than the lower limit of the aforementioned range, the volatility of the thiol compound itself is reduced, and problems with odor are reduced, and on the other hand, when the molecular weight is equal to or lower than the upper limit of the aforementioned range, solubility with regard to component (A) improves.

In the present composition, the content amount of component (B) is an amount where the mercapto groups in the component are within a range of 0.3 to 3 mol, and preferably within a range of 0.5 to 2 mols, or within a range of 0.8 to 1.5 mols per 1 mol of the epoxy groups in component (A). This is because when the content amount of component (B) is equal to or greater than the lower limit of the aforementioned range, the obtained curable organopolysiloxane composition is sufficiently cured, and on the other hand, when the content amount is equal to or lower than the upper limit of the aforementioned range, the mechanical strength of the obtained cured product improves.

Component (C) is a component for promoting curing of the present composition at a low temperature, and is an amine compound that does not have a N—H bond and/or a phosphine compound that does not have a P—H bond.

Examples of the amine compound include triethylamine, tri-n-propylamine, tri-n-butylamine, tri-i-butylamine, tri-n-hexylamine, tri-n-octylamine, triphenylamine, N,N-dimethylaniline, N,N-diethylaniline, dimethyl cyclohexylamine, diethyl cyclohexylamine, 1-methylpiperidine, 4-hydroxy-1-methylpiperidine, 4-methylmorpholine, pyridine, 4-dimethyl aminopyridine (DMAP), N,N'-dimethyl piperazine, 1,3,5-trimethyl hexahydro-1,3,5-triazine, 2,6-dimethyl-2,6-diazaheptane, 2,6,10-trimethyl-2,6,10-triazaundecane, bis(2-dimethyl aminoethyl) ether, 1-(2-dimethyl aminoethyl)-4-methyl piperazine, tris[2-dimethylamino)ethyl]amine, 2,4,6-tris(dimethyl aminomethyl) phenol, and other noncylic and cyclic tertiary amine compounds; and 1,5-diazabicyclo[4.3.0] nonene (DBN), 1,8-diazabicyclo[5.4.0] undecene (DBU), 1,4-diazabicyclo[2.2.2] octane (DABCO), quinuclidine, and other bicyclic tertiary amine compounds.

Furthermore, examples of the phosphine compound include triphenyl phosphine, triorthotolyl phosphine, tri-paratolyl phosphine, tris(paramethoxy phenyl) phosphine, diphenyl cyclohexyl phosphine, tricyclohexyl phosphine, triethyl phosphine, tripropyl phosphine, tri-n-butyl phosphine, tri-t-butyl phosphine, tri-n-hexylphosphine, and tri-n-octyl phosphine.

Component (C) is preferably a tertiary amine compound, which may be used independently, or used by mixing at least two types. By appropriately selecting component (C), the bath life of the curable organopolysiloxane composition of the present invention can be adjusted.

The content amount of component (C) is within a range of 0.01 to 10 mass % per the total amount of components (A) through (C). This is because when the amount of component (C) is equal to or greater than the lower limit of the aforementioned range, a curing reaction of the obtained composition is promoted, and on the other hand, when the amount is equal to or lower than the upper limit of the aforementioned range, an obtained cured product is difficult to color even by aging. In the present composition, by appropriately selecting the content amount of component (C), the bath life of the present composition can be adjusted.

The present composition can be provided for use without a solvent, but may contain (D) an organic solvent as necessary if reducing the viscosity of the present composition or forming a cured product on a thin film is desired. The organic solvent is not particularly restricted so long as curing of the present composition is not inhibited, and the entire composition can uniformly dissolve. The organic solvent preferably has a boiling point that is 70° C. or higher and lower than 200° C., and specific examples include: i-propyl alcohol, t-butyl alcohol, cyclohexanol, ethyl acetate, propyl acetate, butyl acetate, cyclohexanone, methyl ethyl ketone, methyl isobutyl ketone, toluene, xylene, methylene, 1,4-dioxane, dibutyl ether, anisole, 4-methyl anisole, ethyl benzene, ethoxy benzene, ethylene glycol, ethylene glycol dimethyl ether, ethylene glycol diethyl ether, 2-methoxy ethanol (ethylene glycol monomethyl ether), diethylene glycol dimethyl ether, diethylene glycol monomethyl ether, 1-methoxy-2-propyl acetate, 1-ethoxy-2-propyl acetate, octamethyl cyclotetrasiloxane, hexamethyl disiloxane, and other non-halogenated solvents; 1,1,2-trichlorethane, chlorobenzene, and other halogenated solvents; and mixtures of two or more types thereof.

In the present composition, the amount of the organic solvent is not particularly restricted, but is within a range of 0 to 3,000 parts by mass, or preferably within a range of 0 to 1,000 parts by mass per a total of 100 parts by mass of components (A) through (C).

The viscosity at 25° C. of the present composition is not particularly restricted, but is preferably within a range of 10 to 100,000 mPa·s, or within a range of 10 to 10,000 mPa·s. Furthermore, the organic solvent can be added to the present composition to adjust the viscosity to be within the aforementioned viscosity range.

The present composition can contain conventionally known additives such as: fumed silica, crystalline silica, fused silica, wet silica, titanium oxide, zinc oxide, iron oxide, and other metal oxide fine powders; vinyl triethoxysilane, allyl trimethoxysilane, allyl triethoxysilane, 3-glycidoxy propyl trimethoxysilane, 3-methacryloxy propyl trimethoxysilane, and other adhesive imparting agents; and nitrides, sulfides, and other inorganic fillers; pigments; heat resistance improving agents; and the like, as components other than the aforementioned as necessary, so long as an object of the present invention is not impaired.

The present composition can be prepared by uniformly mixing components (A) through (C), and if necessary, other optional components thereof. When preparing the present composition, the components can be mixed at ambient temperature using various stirrers or kneaders, and if the composition is one which is not easily cured during mixing, mixing may be performed under heat. Furthermore, the order of adding the components is not particularly restricted, and mixing is possible in an arbitrary order.

Curing of the present composition advances even at a relatively low temperature of −5 to 30° C. Note that curing can be promoted by heating. The time required for a curing reaction is dependent on the types of components (A) through (C), but is generally within 24 hours at a relatively low temperature.

A cured product of the present invention is formed by curing the aforementioned curable organopolysiloxane composition. The form of the cured product is not particularly restricted, and examples include sheets, films, and tapes.

The present composition can be coated onto a film substrate, tape substrate, or sheet substrate and then cured at −5 to 30° C. to form a cured film on a surface of the substrate. The thickness of the cured film is not particularly restricted, but is preferably 10 to 500 μm or 50 to 100 μm.

Curing can advance even at a relatively low temperature, and therefore, the present composition can be applied to coating of a substrate with inferior heat resistance. Examples of a coating method of the present composition include gravure coating, offset coating, offset gravure, roll coating, reverse roll coating, air knife coating, curtain coating, and comma coating. Furthermore, examples of the type of substrate include paperboards, cardboard paper, clay coated paper, and polyolefin laminated paper, and particularly, polyethylene laminated paper, synthetic resin film/sheet/coating films, natural fiber materials, synthetic fiber materials, artificial leather materials, metal foils, metal sheets, and concrete. The synthetic resin film/sheet/coating films are particularly preferred. For a multilayer coating film, the present composition is generally coated onto a coating film made from an epoxy resin, acrylic resin, urethane resin, or the like.

EXAMPLES

The curable organopolysiloxane composition, cured product thereof, and method for forming a cured film of the present invention are described in detail using examples. In the formulas, Me, Ph, Ep, and Thi respectively represent a methyl group, phenyl group, 3-glycidoxypropyl group, and 3-mercaptopropyl group. Note that in the examples, the viscosity, weight average molecular weight, epoxy group equivalent, and mercapto group equivalent were measured as described below.

[Viscosity]

The viscosity at 25° C. was measured using a rotational viscometer VG-DA manufactured by Shibaura System Co., Ltd.

[Weight Average Molecular Weight]

The weight average molecular weight calculated as standard polystyrene was determined by gel permeation chromatography using a RI detector.

[Epoxy Equivalent and Mercapto Equivalent]

The epoxy equivalent (g/mol) and mercapto equivalent (g/mol) of the organopolysiloxane were determined from the structure identified by nuclear magnetic resonance spectroscopy.

Synthesis Example 1

Preparation of an Epoxy Group-Containing Organopolysiloxane

An amount of 341 g of a hydrolysis and condensation reaction product (weight average molecular weight: 1,000, silanol group content: 8.0 wt %) of phenyl trichlorosilane, 528 g of 3-glycidoxypropyl methyl dimethoxysilane, 517 g of dimethylpolysiloxane capped at both molecular chain ends with trimethyl siloxy groups and having a dynamic viscosity at 25° C. of 5 mm²/s, and 183 g of toluene were inserted into a reactor provided with a stirring device, thermometer, reflux tube, and dripping funnel, and then heated to 50° C. and stirred. Thereafter, a mixture of 2.5 g of cesium hydroxide and 43.2 g of water was gradually added dropwise from the dripping funnel. After the dropwise addition was completed, the mixture was heated and refluxed for one hour. The produced methanol and excess water were removed by azeotropic dehydration and then a reaction was performed for eight hours under a toluene reflux. After cooling, the mixture was neutralized by acetic acid, and heated under reduced pressure to distill away the toluene and low-boiling components, and the neutralized salt was filtered to obtain a yellowish brown transparent liquid with a viscosity of 270 mPa·s. The liquid had a weight average molecular weight of 4,100, and an epoxy equivalence of 530 g/mol, and was confirmed by $^{13}$C-nuclear magnetic resonance spectroscopy to be an epoxy group-containing organopolysiloxane represented by the average unit formula:

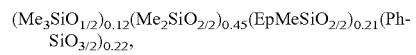

$(Me_3SiO_{1/2})_{0.12}(Me_2SiO_{2/2})_{0.45}(EpMeSiO_{2/2})_{0.21}(PhSiO_{3/2})_{0.22}$, and the average composition formula:

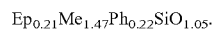

$Ep_{0.21}Me_{1.47}Ph_{0.22}SiO_{1.05}$.

The content of hydroxyl groups, methoxy groups, or other alkoxy groups was less than 1 wt %.

Synthesis Example 2

Preparation of a Mercapto Group-Containing Organopolysiloxane

An amount of 1,374 g of 3-mercaptopropyl trimethoxysilane, 1,680 g of dimethyl dimethoxysilane, and 1.18 g of trifluoromethane sulfonic acid were inserted into a reactor provided with a stirring device, thermometer, reflux tube, and dripping funnel, and stirred, after which 882 g of ion exchanged water was added dropwise at room temperature.

After stirring for one hour under a methanol reflux, calcium carbonate and cyclohexane were added, and the produced methanol and unreacted water were removed by azeotropic dehydration. The remaining low-boiling points material was removed under reduced pressure, and then the solid content was filtered to obtain a colorless transparent liquid with a viscosity of 560 mPa·s. The liquid had a weight average molecular weight of 4,000, and a mercapto equivalent of 260 g/mol, and was confirmed by $^{13}$C-nuclear magnetic resonance spectroscopy to be a mercapto group-containing organopolysiloxane represented by the average unit formula:

$(Me_2SiO_{2/2})_{0.65}(ThiSiO_{3/2})_{0.35}$, and the average composition formula:

$Thi_{0.35}Me_{1.30}SiO_{1.18}$.

Examples 1 to 9 and Comparative Examples 1 to 3

Solvent-free type curable organopolysiloxane compositions were prepared in with the compositions shown in Tables 1 and 2 using the following components. Note that in the curable organopolysiloxane composition, the amount was adjusted such that the content amount of mercapto groups in component (B) was 1 mol per 1 mol of epoxy groups in component (A).

The following component was used as component (A).
(a-1): Epoxy group-containing organopolysiloxane prepared in Synthesis Example 1

The following components were used as component (B).
(b-1): Mercapto group-containing organopolysiloxane prepared in Synthesis Example 2
(b-2): Pentaerythritol-tetrakis(3-mercaptobutyrate) (Karenz MT®PE1 manufactured by Showa Denko KK)

The following components were used as component (C).
(c-1): 2,4,6-tris(dimethylaminomethyl) phenol
(c-2): 2,6-dimethyl-2,6-diazaheptane
(c-3): 1,8-diazabicyclo[5,4,0] undecene
(c-4): 1,4-diazabicyclo[2,2,2] octane
(c-5): 1-(2-dimethyl aminoethyl)-4-methyl piperazine
(c-6): 2,6,10-trimethyl-2,6,10-triazaundecane The following component was used as an amino group-containing organopolysiloxane.
(e-1): 3055 resin manufactured by Dow Corning Toray Co., Ltd. (Viscosity: 3,000 mPa·s, amino equivalence=500 g/mol)

The curable organopolysiloxane composition was evaluated as follows.

[Appearance]
The curable organopolysiloxane composition was prepared, and then the appearance thereof was visually observed.

[Curability]
The curable organopolysiloxane composition was maintained at 25° C. in a glass bottle or on an aluminum dish, the time until fluidity was lost or the composition ceased to adhere to a finger (gelling time) was determined, and the curability was evaluated as follows.

☆☆☆: Gelling time at 25° C. is within 6 hours.
☆☆: Gelling time at 25° C. exceeds 6 hours, but is within 12 hours.
☆: Gelling time at 25° C. exceeds 12 hours, but is within 24 hours.
Δ: Gelling time at 25° C. exceeds 24 hours, but is within 48 hours.
x: Uncured even at 48 hours at 25° C.

The curability at −2° C. was evaluated as follows for a composition cured within 24 hours at 25° C.
☆☆☆: Gelling time at −2° C. is within 6 hours.
☆☆: Gelling time at −2° C. exceeds 6 hours, but is within 12 hours.
☆: Gelling time at −2° C. exceeds 12 hours, but is within 24 hours.
Δ: Gelling time at −2° C. exceeds 24 hours, but is within 48 hours.
x: Uncured even at 48 hours at −2° C.

TABLE 1

| | | Category Present invention | | | | | | | | |
|---|---|---|---|---|---|---|---|---|---|---|
| Item | | Example 1 | Example 2 | Example 3 | Example 4 | Example 5 | Example 6 | Example 7 | Example 8 | Example 9 |
| Composition of Curable Organopolysiloxane Composition (parts by mass) | Component (a-1) | 2.0 | 2.0 | 2.0 | 2.0 | 2.0 | 2.0 | 2.0 | 2.0 | 2.0 |
| | Component (b-1) | — | — | — | — | — | — | 1.057 | — | — |
| | Component (b-2) | 0.514 | 0.514 | 0.514 | 0.514 | 0.514 | 0.514 | — | 0.272 | 1.090 |
| | Component (c-1) | 0.073 | — | — | — | — | — | — | — | — |
| | Component (c-2) | — | 0.073 | — | — | — | — | 0.151 | 0.039 | 0.156 |
| | Component (c-3) | — | — | 0.073 | — | — | — | — | — | — |
| | Component (c-4) | — | — | — | 0.073 | — | — | — | — | — |
| | Component (c-5) | — | — | — | — | 0.073 | — | — | — | — |
| | Component (c-6) | — | — | — | — | — | 0.073 | — | — | — |
| Appearance | | Transparent | Transparent | Transparent | Transparent | Transparent | Transparent | Transparent | Transparent | Transparent |
| Curability at 25° C. | | ☆☆ | ☆☆☆ | ☆☆☆ | ☆☆☆ | ☆☆☆ | ☆☆☆ | ☆☆☆ | ☆☆☆ | ☆☆☆ |
| Curability at −2° C. | | ☆ | ☆ | ☆☆☆ | ☆☆☆ | ☆ | ☆ | ☆☆☆ | ☆ | ☆ |

TABLE 2

| | | Category Comparative Examples | | |
|---|---|---|---|---|
| Item | | Comparative Example 1 | Comparative Example 2 | Comparative Example 3 |
| Composition of Curable Organopolysiloxane Composition (parts by mass) | Component (a-1) | 2.0 | 2.0 | 1.5 |
| | Component (b-2) | 0.514 | — | — |
| | Component (c-6) | — | 0.073 | — |
| | Component (e-1) | — | — | 1.489 |
| Appearance | | Turbid | Transparent | Transparent |
| Curability at 25° C. | | x | x | x |
| Curability at −2° C. | | — | — | — |

Based on the results of Examples 1 through 9, in the curable organopolysiloxane composition of the present invention, it is clear that regardless of component (B), curing at 25° C. proceeded quickly, and curing at −2° C. also proceeded quickly. On the other hand, based on the results of Comparative Examples 1 and 2, the curable organopolysiloxane compositions not having either of component (B) or component (C) were confirmed to not cure or to cure very slowly. Based on the results of Comparative Example 3, the curable organopolysiloxane composition containing an epoxy group-containing organopolysiloxane and an amino group-containing organopolysiloxane was confirmed to cure slowly.

Examples 10 and 11 and Comparative Example 4

Solvent type curable organopolysiloxane compositions were prepared with the compositions shown in Table 3 using the aforementioned components and following component. Note that in the curable organopolysiloxane composition, the content amounts were adjusted such that amount of mercapto groups in component (B) was 1 mol per 1 mol of epoxy groups in component (A).

The following component was used as component (D).

(d-1): Ethyl acetate (manufactured Wako Pure Chemical Industries, Ltd.)

The curable organopolysiloxane composition was evaluated as follows.

[Curability]

The curability of the curable organopolysiloxane composition was evaluated as described above.

[Bonding]

The curable organopolysiloxane composition was coated by flow coating onto a glass plate, dried and cured for one day at room temperature, and then dried and cured further for two hours at 70° C. Bonding of the cure film on the glass plate was evaluated by a cross-cut test (JIS K5400). The results of the evaluation are indicated by "○" when the cured film did not peel, and by "x" when the cured film peeled.

TABLE 3

| | | Category | | |
| --- | --- | --- | --- | --- |
| | | Present invention | | Comparative Examples |
| Item | | Example 10 | Example 11 | Comparative Example 4 |
| Composition of Curable Organopoly- siloxane Composition (parts by mass) | Component (a-1) | 0.5 | 0.5 | 0.5 |
| | Component (b-1) | 0.26 | — | — |
| | Component (b-2) | — | 0.13 | — |
| | Component (c-6) | 0.04 | 0.02 | — |
| | Component (e-1) | — | — | 0.496 |
| | Component (d-1) | 3.06 | 2.51 | 2.00 |
| Curability at 25° C. | | ☆☆☆ | ☆ | Δ |
| Curability at −2° C. | | ☆ | Δ | x |
| Bonding | | ○ | ○ | ○ |

Based on the results of Examples 10 and 11, with the curable organopolysiloxane composition of the present invention, regardless of component (B), curing at 25° C. was confirmed to occur quickly, curing at −2° C. was also confirmed to occur quickly, and bonding of the obtained cured film was confirmed to be favorable. On the other hand, based on the results of Comparative Example 4, the curable organopolysiloxane composition made from an epoxy group-containing organopolysiloxane and an amino group-containing organopolysiloxane was confirmed to cure slowly at a relatively low temperature.

INDUSTRIAL APPLICABILITY

The curable organopolysiloxane composition of the present invention has favorable curability even at relatively low temperatures, and forms a cured film with excellent bonding with regard to an article to be coated, and therefore is favorable as a coating composition for coating an article to be coated which has inferior heat resistance, or coating a structure on which the use of heating means is difficult.

The invention claimed is:

1. A curable organopolysiloxane composition comprising:
   (A) an epoxy group-containing organopolysiloxane represented by the average composition formula:

wherein X represents at least one type of epoxy group selected from the group consisting of a glycidoxyalkyl group, an epoxycycloalkyl alkyl group, and an epoxyalkyl group; $R^1$ represents a hydrogen atom, an alkyl group with 1 to 12 carbon atoms, an alkenyl group with 2 to 12 carbon atoms, an aryl group with 6 to 20 carbon atoms, an aralkyl group with 7 to 20 carbon atoms, a hydroxyl group, or an alkoxy group with 1 to 6 carbon atoms; provided at least two X groups are present in a molecule, and provided at least two siloxy units selected from the group consisting of $YSiO_{3/2}$ and $SiO_2$ siloxy units are present in the molecule where Y is X or $R^1$, each as defined above; and "a" and "b" are numbers satisfying: 0<a<1, 0<b<3, and 0.8<(a+b)<3;
   (B) a compound having at least two mercapto groups in a molecule, in an amount such that mercapto groups in component (B) per 1 mol of the epoxy group in component (A) are 0.3 to 3 mols; and
   (C) an amine compound not having a N—H bond and/or a phosphine compound not having a P—H bond, in an amount of 0.01 to 10 mass % per the total amount of components (A) through (C);
   wherein the weight average molecular weight measured by gel permeation chromatography of component (A) is from 1,000 or more and 50,000 or less.

2. The curable organopolysiloxane composition according to claim 1, wherein component (B) is:
   (B1) a mercapto group-containing organopolysiloxane represented by the average composition formula:

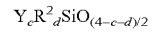

wherein Y represents at least one type of mercapto group selected from the group consisting of a mercaptoalkyl group and a mercaptoaryl group; $R^2$ represents a hydrogen atom, an alkyl group with 1 to 12 carbon atoms, an alkenyl group with 2 to 12 carbon atoms, an aryl group with 6 to 20 carbon atoms, an aralkyl group with 7 to 20 carbon atoms, a hydroxyl group, or an alkoxy group with 1 to 6 carbon atoms; provided at least two Y groups are present in a molecule; and "c" and "d" represent numbers satisfying: 0<c<1, 0<d<3, and 0.8<(c+d)<3; and/or
   (B2) a thiol compound having at least two mercapto groups in a molecule.

3. The curable organopolysiloxane composition according to claim 1, wherein component (C) is a tertiary amine compound.

4. The curable organopolysiloxane composition according to claim 1, further comprising:
(D) an organic solvent in an amount of from greater than 0 to 3,000 parts by mass per a total of 100 parts by mass of components (A) through (C).

5. The curable organopolysiloxane composition according to claim 1, further defined as a coating composition.

6. A cured product formed by curing the curable organopolysiloxane composition according to claim 1.

7. A method for forming a cured film, the method comprising the steps of:
coating a curable organopolysiloxane composition onto an object to be coated; and
curing the curable organopolysiloxane composition at −5 to 30° C.;
wherein the curable organopolysiloxane composition is according to claim 5.

8. The curable organopolysiloxane composition according to claim 2, wherein component (C) is a tertiary amine compound.

9. The curable organopolysiloxane composition according to claim 2, further comprising:
(D) an organic solvent in an amount of from greater than 0 to 3,000 parts by mass per a total of 100 parts by mass of components (A) through (C).

10. The curable organopolysiloxane composition according to claim 3, further comprising:
(D) an organic solvent in an amount of from greater than 0 to 3,000 parts by mass per a total of 100 parts by mass of components (A) through (C).

11. The curable organopolysiloxane composition according to claim 2, wherein component (B) is component (B1).

12. The curable organopolysiloxane composition according to claim 2, wherein component (B) is component (B2).

13. The curable organopolysiloxane composition according to claim 1, wherein component (C) is the amine compound not having a N—H bond.

14. The curable organopolysiloxane composition according to claim 1, wherein component (C) is the phosphine compound not having a P—H bond.

15. The curable organopolysiloxane composition according to claim 1, wherein component (A) includes at least one phenyl group in the molecule.

16. The curable organopolysiloxane composition according to claim 15, wherein component (A) includes at least one $(PhSiO_{3/2})$ siloxy unit, where Ph is phenyl.

17. The curable organopolysiloxane composition according to claim 16, wherein component (A) includes at least one $XR^1SiO_{2/2}$ siloxy unit, where each of X and $R^1$ is as defined above.

18. The curable organopolysiloxane composition according to claim 15, wherein component (A) includes at least one $XR^1SiO_{2/2}$ siloxy unit or $XSiO_{3/2}$ siloxy unit, where each of X and $R^1$ is as defined above.

19. The curable organopolysiloxane composition according to claim 1, wherein $0<a\leq0.4$.

20. The curable organopolysiloxane composition according to claim 19, wherein $1<(a+b)\leq2$.

* * * * *